United States Patent

[11] 3,619,211

[72] Inventors Stephen S. Chang
East Brunswick;
Boyapalle Rami Reddy, Piscataway, both of N.J.
[21] Appl. No. 751,335
[22] Filed Aug. 9, 1968
[45] Patented Nov. 9, 1971
[73] Assignee Research Corporation
New York, N.Y.

[54] POTATO AND POTATO CHIP FLAVOR AND AROMA
5 Claims, No Drawings

[52] U.S. Cl. ................................................... 99/140, 99/118
[51] Int. Cl. ...................................................... A23l 1/22
[50] Field of Search .......................................... 99/118, 140, 163, 100

[56] References Cited
UNITED STATES PATENTS

| | | | |
|---|---|---|---|
| 2,934,437 | 4/1960 | Morton | 99/140 |
| 3,102,817 | 9/1963 | Green | 99/140 |
| 3,480,447 | 11/1969 | Hack | 99/140 |

*Primary Examiner*—Norman Yudkoff
*Assistant Examiner*—Martin G. Mullen
*Attorneys*—Robert S. Dunham, P E. Henninger, Lester W. Clark, Gerald W. Griffin, Thomas F. Moran, Howard J. Churchill, R. Bradlee Boal and Christopher C. Dunham ABSTRACT: A flavor and aroma reminiscent of potato and potato chip is prepared by heating methionine or a mixture of methionine and a reducing sugar, such as glucose, in the presence of an oil, such as a cooking oil, e.g. corn oil, such as heating under deep fat frying conditions. The resulting oil can be used as a salad oil or as an ingredient of a salad dressing or soups, such as potato soup or tomato soup, or can be used as a frying oil or applied to food products since the the resulting oil has a potato and potato chip flavor and aroma. A potato and potato chip flavor and aroma can also be imparted to foods, including food of animal or vegetable origin, including sea food, such as snack foods prepared from starch or flour, by applying or incorporating methionine in such foods followed by heating, such as deep fat frying. Additionally, a potato chip of improved taste can be obtained by adding methionine to potato slices and then frying in oil or by employing in the manufacture of potato chips a cooking or deep fat frying oil containing methionine or an admixture of methionine and a reducing sugar, such as glucose.

POTATO AND POTATO CHIP FLAVOR AND AROMA

This invention relates to food products and the preparation of food products. More particularly, this invention is directed to the preparation of a flavor material reminiscent of potato chip and potato and a method of preparing food products having a potato and potato chip flavor and aroma.

Various techniques have been disclosed for improving the flavor and quality of food products, see U.S. Pat. Nos. 2,589,591 and 3,268,551. In the food industry, particularly in the snack food industry, it is especially desirable to produce a flavor material capable of imparting to food a potato chip flavor. For example, it would be particularly desirable to be able to impart a potato chip flavor and aroma to snack foods prepared from starch, meal or flour, particularly snack foods prepared from corn starch, potato starch, waxy maize starch, tapioca, corn meal, wheat flour, soya flour, soy bean protein and/or amylopectin which may or may not be pregelatinized, since these foods when prepared by baking or by deep fat frying do not possess to the desired extent a potato chip flavor or aroma.

It is an object of this invention to provide a process for imparting a potato or potato chip flavor and aroma to food products and the like.

It is another object of this invention to prepare a flavor material having a flavor and aroma reminiscent of potato and potato chip.

Another object of this invention is to prepare an oil such as an oil suitable for use as a cooking oil or as a component of a salad dressing and possessing a potato chip flavor and aroma and/or capable of imparting a potato chip flavor and aroma to the products admixed therewith or prepared therefrom, such as food products cooked or processed, e.g. by deep fat frying, by means of such an oil.

How these and other objects of this invention are achieved will become apparent in the light of the accompanying disclosure. In at least one embodiment of the practice of this invention at least one of the foregoing objects will be achieved.

It has been discovered that methionine or methionine in admixture with a reducing sugar, such as glucose, when subjected to heating, such as heating in the presence of oil, e.g. deep fat frying, produces a flavor and aroma reminiscent of potato and potato chip. It has also been observed that the produced flavor possesses a tomato flavor note which is more noticeable when the flavor is produced in accordance with this invention at the lower temperature range.

In the preparation of the potato and potato chip flavor and aroma in accordance with this invention substantially any oil may be employed. Suitable such oils, especially those fit for human consumption, include the well known animal and vegetable oils and fats, e.g. lard, tallow, coconut oil, palm kernel oil, sunflower oil, corn oil, soya oil, peanut oil and safflower oil. Also suitable are the various hydrogenated oils either saturated or unsaturated, normally liquid or normally solid. If in the practice of this invention the potato and potato chip flavor and aroma ingredients are to be separately recovered or concentrated, oils, such as mineral oil or synthetic oils, e.g. silicone oil, usually not considered edible oils, may be employed.

The potato and potato chip flavor and aroma appears to be brought about by the heating of methionine in the presence of oil, such as by heating under deep fat frying conditions, i.e. heating methionine in oil in the presence of water and with some access to or in contact with air or in a nitrogen or other substantially inert atmosphere. Usually a temperature upwards of about 100° C., such as a temperature in the range 120°-220° C., particularly a temperature of about 180°-185° C., more or less, is effective when heating methionine in the presence of oil as under deep fat frying conditions, to produce the desired potato and potato chip flavor and aroma. Higher temperatures upwards of 200° C., more or less, up to about 220° C. might be employed, if desired. Effective and satisfactory results are obtained when methionine is heated at a temperature of about 185° C. When simply heating methionine in the presence of oil, preferably with agitation or stirring, the desirable aroma begins to be generated at a temperature as low as about 40°-50° C. However, the most desirable temperature range for heating is the temperature range 90°-130° C., although temperatures in the ranges 50°-90° C. and 130°-220° C. yield satisfactory results.

If desired, there may be admixed with the methionine a minor amount of reducing sugar, such as glucose, although the presence of a reducing sugar for the production of the desired potato chip flavor and aroma is not essential. Some desirable results are obtained, particularly with respect to the quality of the food material processed, when in accordance with the practices of this invention the methionine contains a reducing sugar admixed therewith. Other reducing sugars suitable for use in this invention are known and include maltose and lactose.

It has been observed that the temperature requirements to produce the desired flavor and aroma when methionine is heated in the presence of oil as opposed to methionine when heated in oil under deep fat frying conditions are somewhat different. For example, when methionine or a mixture of methionine or a reducing sugar, such as glucose, is suspended in oil or added to oil, and the oil then heated with agitation either in the presence of air or in a substantially inert atmosphere, such as in the presence of nitrogen, which may be bubbled through or swept over the heated oil to carry away the resulting produced odor and flavor materials, a good aroma and flavor is produced at an atmosphere as low as 50° C. The aroma and flavor become more intense as the temperature is raised. At 110° C. a strong odor and aroma are noticeable. At a temperature of above about 130° C. under these conditions it appears that the quality of the aroma and flavor begins to deteriorate. When methionine is heated in oil under deep fat frying conditions, temperatures above 100° C. in the deep fat frying temperature range are employed, for example a temperature of about 180° C. When methionine or a mixture of methionine and a reducing sugar, such as glucose, dissolved and/or suspended in water is applied to cotton balls and the resulting wetted cotton balls then immersed in oil under deep fat frying conditions a good aroma and flavor are generated. It would appear that equivalent results would also be obtained if an aqueous solution and/or dispersion of methionine was added directly to the heated oil maintained at deep fat frying temperature.

The flavor and aroma generated by heating methionine or an admixture of methionine and a reducing sugar in the presence of oil or under deep fat frying conditions can be recovered and added to food products to enhance and to improve their aroma and flavor and/or to impart a potato and potato chip flavor and aroma thereto. As mentioned hereinabove the flavor also possesses a tomato flavor note. The production and recovery of a potato and potato chip flavor can readily be carried out by subjecting methionine to deep fat frying followed by recovery of the resulting volatilized or vaporized materials. The vaporized and volatilized materials either before or after fractionation may be incorporated in a suitable carrier, liquid or solid, and then applied to foods or employed in the preparation of foods so as to impart a potato and/or potato chip flavor and aroma thereto.

In accordance with another embodiment of the practice of this invention, it has been discovered that an oil employed in the heating of methionine, such as an oil subjected to deep fat frying conditions in the presence of methionine, can be further treated by removing therefrom the more volatile components. The resulting oil can be subjected to steam distillation, preferably vacuum steam distillation. It has been observed that an oil so treated, although evidencing a reduced strength in its aroma and flavor, nevertheless shows an improved quality with respect to its aroma and flavor. The aroma and flavor of the oil becomes even more pleasant and desirable. The resulting oil can be used to produce food products with a potato and potato chip flavor. For example, it may be used as the frying medium for potato chips and other snack foods and it may be used to spray on food products prepared as a substitute for potato chips. It may also be used as a salad oil and as an ingredient of salad dressings and soups.

In accordance with yet another embodiment of this invention a food product possessing a potato and potato chip flavor and aroma may be prepared by incorporating methionine or an admixture of methionine and a reducing sugar in a food product during processing and then subjecting the food product to heating, such as by baking or by heating in the presence of oil or under deep fat frying conditions in order to develop the desired aroma and flavor therein. In still another embodiment of this invention, cooking oil has dissolved and/or dispersed therein an amount of methionine or methionine and reducing sugar, such as glucose, sufficient so that upon heating the oil there is produced an aroma and flavor reminiscent of potato and potato chip.

Tests have demonstrated that methionine does not produce the strong pleasant aroma and flavor reminiscent of potato and potato chip under conditions other than by heating in accordance with this invention in the presence of oil or under deep fat frying conditions. For example, when methionine is heated dry in air at a temperature in the range 150°–185° C. a pungent unpleasant odor is produced. When methionine is heated under reflux in water only a very weak odor is observable. Even in combination with glucose, methionine yields only a weak aroma after refluxing in water.

Methionine does not lead to or cause formation of a dark brown color when heated in oil under deep fat frying conditions. At a concentration sufficient for the generation of a strong aroma and flavor reminiscent of potato and potato chip only a light yellow color is developed in the material containing methionine when subjected to heating, such as heating in the presence of oil. Even in combination with glucose the color developed during heating in oil or in deep fat frying can be reduced to a light yellow by controlling the amount of glucose admixed with the methionine.

In the practice of this invention only very minor, almost slight, amounts of methionine or methionine and a reducing sugar, such as glucose, are required to impart or to generate the desired flavor and aroma. Usually an amount of methionine in the range 0.001–4.0 percent by weight, such as an amount in the range 0.001–2.0 percent, e.g. 0.025–0.1 percent when incorporated in oil or an amount in the range 0.001–4.0 percent by weight on a wet food basis when incorporated in a food product, is sufficient to generate and produce a flavor and aroma reminiscent of potato and potato chip. Larger amounts of methionine may be used if desired. When a reducing sugar, such as glucose, is employed in admixture with methionine, the amount of glucose is usually substantially less than that of methionine, such as an amount in the range about 1–25 percent by weight based on the weight of the methionine, usually an amount in the range about 10–20 percent.

The following examples are illustrative of the practice of this invention:

EXAMPLE NO. 1

This example illustrates the generation and production of an aroma and flavor reminiscent of potato and potato chips by heating methionine under conditions of deep fat frying. Corn oil in an amount of 2300 ml. was heated in a household deep fat fryer to 185° C. and maintained at this temperature. A saturated solution of methionine in water containing approximately 2.7 percent by weight methionine was prepared. Twenty cotton balls were each moistened with 1.5 ml. of the saturated aqueous methionine solution and these cotton balls were then deep fat fried in the heated corn oil for 3 minutes. The deep fat frying was continued until a total of 180 cotton balls were fried. The volatile flavor and aroma ingredients produced during the deep fat frying were collected and the collected flavor and aroma ingredients had a strong pleasant aroma reminiscent of potato and potato chips.

EXAMPLE NO. 2

This example is illustrative of the preparation of a cooking oil having a potato and potato chip flavor and aroma. The cooking oil used in example no. 1, after deep fat frying of the methionine-containing cotton balls, was vacuum steam distilled at a temperature of 150° C. for 1 hour at a vacuum of 0.02 mm. Hg. The oil after vacuum steam distillation possessed a pleasant and desirable aroma and flavor reminiscent of potato and potato chip.

EXAMPLE NO. 3

Corn oil in the amount of 100 grams was placed in a container and 50 mg. of methionine were added to the corn oil. The resulting admixture was stirred and heated. When the temperature of the admixture reached 50° C. a good aroma and flavor of potato and potato chip was developed. As the temperature was increased the aroma and flavor intensified and at 110° C. a strong odor and aroma were noticed. A potato and potato chip flavor and aroma were developed in the corn oil. When the temperature of the admixture reached 130° C. the quality of the aroma and flavor began to deteriorate and further increase in temperature resulted in an increase in the undesirable notes in the aroma flavor.

EXAMPLE NO. 4

This example is illustrative of the generation of a potato and potato chip flavor and aroma by heating a mixture of methionine and glucose under conditions of deep fat frying. Corn oil in an amount of 4.5 pounds was heated in a household deep fat fryer to a temperature of 185° C. and maintained at this temperature. A saturated aqueous solution of methionine was then prepared and to each 100 ml. of this solution 0.37 gram of glucose was added. Twenty cotton balls were then moistened with 1.5 ml. of the resulting methionine-glucose solution and the cotton balls were then deep fat fried in the corn oil for 30 minutes. The frying was continued until a total of 180 cotton balls were fried. There were developed in the corn oil an aroma and flavor reminiscent of potato and potato chip. Further, the cotton balls after frying evidenced a potato and potato chip flavor and aroma.

EXAMPLE NO. 5

This example is illustrative of the use of methionine in accordance with this invention to improve the flavor of potato chips. Two batches, a control batch and a test batch, of potato chips were prepared under the same conditions using the same raw materials. No additive was employed in the preparation of the control batch. In the preparation of the test batch 20 mg. of methionine were added for each 100 grams of potato slices. The two batches of potato chips were then organoleptically evaluated by a panel of eight members. There was a clear indication that the panel evaluated the test batch of potato chips prepared with added methionine as superior in flavor to the control batch.

EXAMPLE NO. 6

Potato chips were prepared from regular, commercially available corn oil and potato chips were prepared from a corn oil prepared in accordance with the treatment described in example no. 2. Upon evaluation by an organoleptic evaluation panel it was found that the potato chips prepared from a corn oil treated in the manner described in example no. 2, i.e. corn oil which had been subjected to deep fat frying conditions in the presence of methionine, were preferred over those potato chips prepared from regular commercial corn oil.

In the light of the foregoing examples, it can be seen in accordance with the practices of this invention that methionine can be employed to improve or to enhance the flavor of potato chips, french fries and other deep fat fried or pan fried potato food products. The practice of this invention is particularly applicable to improving the flavor of snack foods made from flour, meal or starch, even potato flour or potato starch since such food products generally lack a potato or potato chip flavor. Additionally, the practice of this invention is also applicable to improve the flavor of foods made from dehydrated instant potato flakes or granules by restoring the potato flavor and aroma and for the preparation of an oil which can be used as a salad oil, a frying oil or as a spray on food products or as a component of salad dressing.

As will be apparent to those skilled in the art in the light of the foregoing disclosure, many substitutions, alterations and modifications are possible in the practice of this invention without departing from the spirit or scope thereof.

We claim:

1. A potato and potato chip flavor material produced by forming an admixture containing an edible oil and an amount by weight of methionine in the range of 0.001–4.0 percent, heating the resulting admixture to produce a volatilized product derived from the methionine and oil in said admixture and condensing and recovering the resulting volatilized product as said potato and potato chip flavor material.

2. A potato and potato chip flavor material produced in accordance with claim 1 wherein the methionine in said admixture is heated under deep fat frying conditions.

3. A potato and potato chip flavor material produced in accordance with claim 1 wherein said admixture contains a minor amount by weight of a reducing sugar.

4. A potato and potato chip flavor material produced in accordance with claim 3 wherein said admixture is heated under deep fat frying conditions.

5. A potato and potato chip flavor material produced in accordance with claim 1 wherein said admixture is heated to a temperature in the range from about 50° C. to about 220° C.

* * * * *